April 21, 1931. T. J. HILE ET AL 1,801,744
POWER TAKE-OFF
Filed Oct. 17, 1929 2 Sheets-Sheet 2
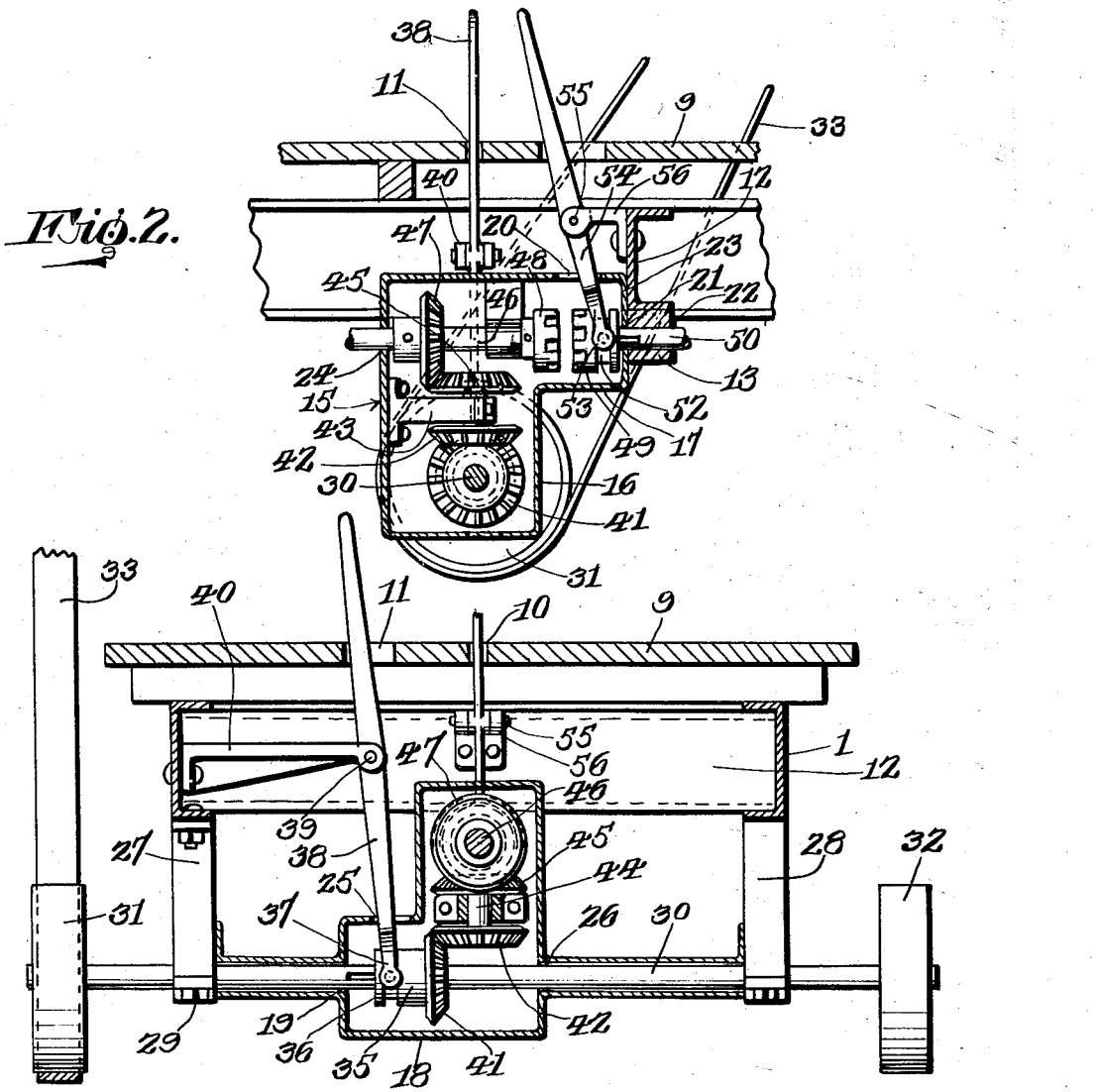
INVENTORS.
Thomas J. Hile,
AND, Lytle D. Barber,
Geo. P. Kimmel
ATTORNEY.

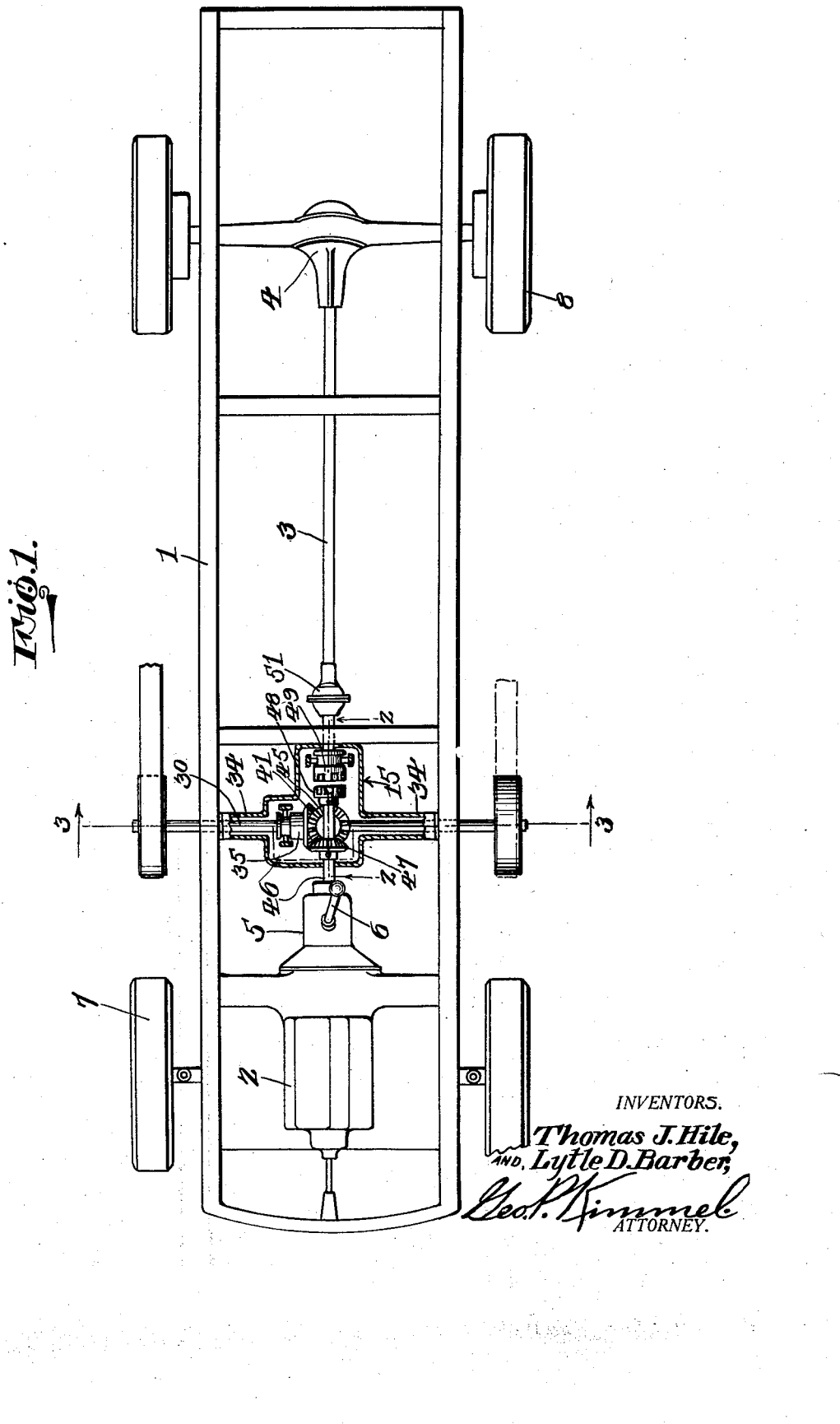

Patented Apr. 21, 1931

1,801,744

UNITED STATES PATENT OFFICE

THOMAS J. HILE, OF IRON CITY, AND LYTLE D. BARBER, OF CLIMAX, GEORGIA

POWER TAKE-OFF

Application filed October 17, 1929. Serial No. 400,372.

This invention relates to a power take-off mechanism designed primarily for use in connection with motor vehicles, but it is to be understood that a power take-off mechanism, in accordance with this invention may be employed in any connection for which it is found applicable, and the invention has for its object to provide, in a manner as hereinafter set forth, a mechanism of the class referred to associated with the transmission of a motor vehicle and including driven elements to provide for the transmission of power for the purpose of driving machines of various types which are positioned adjacent the motor vehicle when the latter is standing still, and further including means to provide for the propelling of the vehicle when occasion requires independently of the operation of said driving element, and further to provide for the operation of the said driven elements simultaneously with the propelling of the vehicle.

Further objects of the invention are to provide, in a manner as hereinafter set forth, a power take-off mechanism which is simple in its construction and arrangement, strong, durable, thoroughly efficient in its use, conveniently installed with respect to the transmission and propelling shaft of a motor vehicle, readily set in the position desired for the purpose of transmitting power for selective driving purposes, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be restorted to which fall within the scope of the claims hereunto appended.

In the drawings wherein like reference characters denote corresponding parts throughout the several views:

Figure 1 is a fragmentary view in top plan of a motor vehicle showing the adaptation therewith of a power take-off mechanism in accordance with this invention.

Figure 2 is a section on line 2—2, Figure 1.

Figure 3 is a section on line 3—3, Figure 1.

Referring to the drawings in detail 1 denotes a chassis of a motor vehicle, 2 the motor, 3 the propelling shaft, 4 the differential, 5 the transmission, 6 the clutch for controlling the transmission, 7 the front wheels and 8 the rear wheels of the vehicle.

As illustrated the chassis 1 has mounted thereon a flooring or board 9 formed with a longitudinally extending slot 10 and a transversely extending slot 11, the latter being arranged forwardly of the former. The purpose of the slots 10 and 11 will be presently referred to.

Connected to the sides of the chassis 1 and arranged below the flooring 9 is a transversely extending combined bracing and supporting beam 12. Secured to the bottom of the beam 12 is a bearing piece 13. Secured to the forward face of beam 12 and also secured to the bearing piece 13 is a depending housing referred to generally at 15 formed with a vertically disposed portion 16 and a horizontally disposed portion 17, the latter projecting at an angle from the upper end of the portion 16. The housing 15 further includes a horizontally disposed portion 18 which extends at right angles with respect to the portion 17 and which is arranged at the lower part of the portion 16. One of the vertical walls of the portion 18 is formed with an opening 19. The top wall of the portion 17 is provided with a slot 20 and that end wall of the portion 17 which is secured to the beam 12 and bearing part or piece 13 is apertured as at 21 and such aperture registers with the aperture 22 provided in the bearing piece or part 13. That wall of the portion 17 which opposes the apertured wall 23 thereof is formed with an opening 24 which aligns with the opening 21. The top wall of the portion 19 is formed with a slot 25, and the wall of the portion 18 which opposes that wall thereof provided with the opening 19 is formed with an opening 26 which is arranged in alignment with the opening 19.

Depending from the sides of the chassis 1 are hangers 27, 28, each having a bearing 29 at its lower end and extending through said bearings is a transversely disposed transmission shaft 30 of a length greater than the width of the chassis 1 and of such length as to project laterally from each side of the chassis. The outer ends of the shaft 30 have connected therewith pulley wheels 31, 32 adapted to have transmission belts 33 operated thereby for the purpose of driving machines which are positioned adjacent the motor vehicle.

The housing 15 has formed integral therewith a pair of oppositely disposed tubular extensions 34 which project to the hangers 27, 28 and enclose portions of the shaft 30.

The shaft 30 has mounted thereon, as well as keyed therewith a shiftable sleeve 35 having a peripheral groove 36 in which is mounted a fork 37, carried on the lower end of a lever member 38 which extends up through the slot 25 and is pivotally connected, as at 39 to a bracket 40 fixed to and extending inwardly from one of the sides of the chassis 1. The lever 38 extends up through the slot 11. The sleeve 35 is provided for shifting a loosely mounted gear 41 to engage a beveled driving gear 42 therefor, whereby the gear 41 will be clutched to the shaft 30 and the latter operated.

Arranged within the housing 15 is a bracket 43 through which extends a vertically disposed stub-shaft 44, which has fixed to its lower end the bevelled gear 42 and also fixed to its upper end a bevelled gear 45.

Extending rearwardly from the transmission 5 and operated thereby is a transmission shaft 46 which passes through opening 24 and extends a substantial distance across the upper portion of housing 15. Fixed to the shaft 46 and arranged within the housing 15 is a beveled gear 47, which meshes with the bevelled gear 45 for the purpose of driving the latter. The rear end of shaft 46 has fixed thereto a clutch member 48, which normally is spaced forward from a clutch member 49 carried on the forward end of a transmission shaft 50 which extends through the openings 21 and 22 into the housing 15. The clutch member 49 is slidably keyed to the shaft 50 and the latter extends rearwardly through the bearing piece or part 13 and is connected by a universal joint 51 to the forward end of the vehicle propelling shaft 3. The clutch member 49 is peripherally grooved as at 52 and operating therein is a fork 53 carried on the lower end of a shifting lever 54, which is pivotally connected as at 55 to a bracket 56 which extends forwardly from the beam 12. The lever 54 extends up through the slot 10.

The clutch lever 6 provides for disconnecting the transmission 5 from the motor 2 when occasion requires.

The arrangement of the take-off mechanism, in accordance with this invention provides for the independent driving of the shaft 30 with respect to propeller shaft 3, for the independent driving of the propeller shaft 3 with respect to the shaft 30, and the mechanism furthermore provides whereby the shafts 3 and 30 can be operated simultaneously. The arrangement of the take-off mechanism further provides whereby the shaft 30 can be operated for driving purposes when the vehicle is standing still or such shaft 30 can be operated when the vehicle is propelled through the medium of shaft 3.

It is thought the many advantages of a take-off mechanism, in accordance with this invention and for the purpose set forth can be readily understood, and although the preferred embodiment of the invention is as illustrated and described, yet it is to be understood that changes in the details of construction can be had which fall within the scope of the invention as claimed.

What we claim is:

1. In combination in a motor vehicle, a transmission mechanism, a transmission shaft operatively connected at its forward end with and driven from said mechanism, said shaft having its rear end provided with a fixed clutching element, a second transmission shaft endwise aligning with and spaced from said first shaft and having provided on the forward end thereof a bodily slidable clutching element, coacting, when shifted forwardly with said other element to provide for the operation of said second shaft from said first shaft, a third transmission shaft positioned below said other shafts, extending transversely of and supported from the chassis of the vehicle and provided with a power transmitting pulley at each end thereof, a vertically disposed shaft having fixed thereto an upper and a lower gear spaced from each other, a bodily slidable driving gear carried by said third shaft and coacting when slid inwardly with said lower gear for driving said third shaft, a driving gear carried by said first shaft and coacting with said upper gear for driving said vertical shaft, and spaced means for moving said slidable clutching element and slidable driving gear to active position.

2. In combination in a motor vehicle, a transmission mechanism, a transmission shaft operatively connected at its forward end with and driven from said mechanism, said shaft having its rear end provided with a fixed clutching element, a second transmission shaft endwise aligning with and spaced from said first shaft and having provided on the forward end thereof a bodily slidable clutching element, coacting, when shifted forwardly with said other element to provide for the operation of said second shaft from said first shaft, a third transmission shaft positioned below said other shafts, extending transversely of and supported from the chassis of the vehicle and provided with a power transmitting pulley at each end thereof, a vertically disposed shaft having fixed thereto an upper and a lower gear spaced from each other, a bodily slidable driving gear carried by said third shaft and coacting when slid inwardly with said lower gear for driving said third shaft, a driving gear carried by said first shaft and coacting with said upper gear for driving said vertical shaft, spaced means for moving said slidable clutching element and slidable driving gear to active position, and a casing secured to and depending from the chassis of the vehicle and provided with means for supporting said shafts.

In testimony whereof, we affix our signatures hereto.

THOMAS J. HILE.
LYTLE D. BARBER.